(12) United States Patent
Rothfuss (10) Patent No.: US 9,469,882 B2
(45) Date of Patent: Oct. 18, 2016

(54) REFRACTORY PURGING DEVICES

(71) Applicant: VESUVIUS CRUCIBLE COMPANY, Wilmington, DE (US)

(72) Inventor: Hans Rothfuss, Taunusstein (DE)

(73) Assignee: VESUVIUS CRUCIBLE COMPANY, Wilmington, DE (US)

( * ) Notice: Subject to any disclaimer, the term of this patent is extended or adjusted under 35 U.S.C. 154(b) by 269 days.

(21) Appl. No.: 14/355,665

(22) PCT Filed: Nov. 2, 2012

(86) PCT No.: PCT/EP2012/071765
§ 371 (c)(1),
(2) Date: May 1, 2014

(87) PCT Pub. No.: WO2013/064668
PCT Pub. Date: May 10, 2013

(65) Prior Publication Data
US 2014/0300036 A1  Oct. 9, 2014

(30) Foreign Application Priority Data

Nov. 3, 2011  (EP) .................................. 11187633

(51) Int. Cl.
| | | |
|---|---|---|
| C21C 5/48 | (2006.01) | |
| B22D 1/00 | (2006.01) | |
| C21C 5/34 | (2006.01) | |
| C04B 35/64 | (2006.01) | |

(52) U.S. Cl.
CPC ................ C21C 5/48 (2013.01); B22D 1/005 (2013.01); C04B 35/64 (2013.01); C21C 5/34 (2013.01); C21C 2250/08 (2013.01)

(58) Field of Classification Search
CPC .... F27D 3/16; F27D 2003/161; B22D 1/005
USPC ......................................................... 266/220
See application file for complete search history.

(56) References Cited

U.S. PATENT DOCUMENTS

| | | | |
|---|---|---|---|
| 5,225,143 A * | 7/1993 | Labate, II .............. | B22D 1/005 266/220 |
| 5,478,053 A | 12/1995 | Richter et al. | |
| 5,820,816 A | 10/1998 | Hicks | |
| 5,855,843 A * | 1/1999 | Wandschneider ..... | B22D 1/005 266/220 |
| 6,669,896 B1 | 12/2003 | Sahlin et al. | |
| 2014/0300036 A1* | 10/2014 | Rothfuss ............... | B22D 1/005 266/217 |

FOREIGN PATENT DOCUMENTS

| | | |
|---|---|---|
| DE | 19846524 A1 | 4/2000 |
| EP | 1077266 A2 | 2/2001 |
| JP | 58212837 A | 12/1983 |
| JP | 63248543 A | 10/1988 |

* cited by examiner

*Primary Examiner* — Scott Kastler
(74) *Attorney, Agent, or Firm* — Thomas Clinton; Donald M. Satina (57) ABSTRACT

A device for blowing gas into a metallurgical vessel contains at least one gas flow channel fluidly connecting a gas inlet located at one end to a gas outlet located at the opposite end. The channel is in the shape of a slit. The gas channel contains a series of continuous concave bridges connecting the opposing surfaces defining the channel, with their concave side oriented towards the gas outlet. The concave bridges are disposed in a staggered arrangement, such that any shortest line running from the gas outlet to the gas inlet of the channel necessarily intercepts the concave side of at least one bridge. The device is resistant to clogging by infiltrated molten metal or slag.

15 Claims, 5 Drawing Sheets

REFRACTORY PURGING DEVICES

FIELD OF THE INVENTION

The present invention relates to refractory purging devices, for example refractory purging devices such as refractory purging plugs, tuyeres, diffusers, bubbling blocks or pads and the like. The present disclosure also relates to moulding tools for and methods of making refractory purging devices.

BACKGROUND OF THE INVENTION (1) Field of the Invention

In metal forming processes, metal melt is transferred from one metallurgical vessel to another or to a mould. For example a ladle is filled with metal melt out of a furnace and transferred to a tundish. The metal melt can then be cast from the tundish to a mould for forming slabs, billets or blooms. Alternately, ingots could also be poured into direct from the ladle. In most cases, it is desirable to blow a gas into the molten metal contained in such metallurgical vessels. This can be useful to accelerate the homogenization of the temperature and composition of a bath, to carry non-metallic inclusions present in the bulk of the bath up into the slag top layer, to create favourable conditions within the molten metal, and the like. The gas is generally blown into the molten metal by means of refractory purging devices such as purging plugs which are located at the bottom or side of a metallurgical vessel such as a ladle or a tundish.

(2) Description of the Related Art

Refractory purging devices such as purging plugs usually comprises a block of refractory material, generally extending along a longitudinal axis. At one longitudinal end of the block, a gas inlet connected to a source of pressurized gas is fluidly connected to a gas outlet at the opposite longitudinal end of the block. The gas inlet and gas outlet may be fluidly connected to one another through an open pore network, by one or more channels (e.g., slit shaped or with circular cross-section), or a combination of both. An open pore network is sometimes said to yield "indirect permeability," whilst a channel is said to yield "direct permeability." It is generally recognized that indirect permeability plugs are more efficient than direct permeability plugs, in terms of opening rate and stir effectiveness (due to bubble size and working area). One downside to porous plugs (indirect) is that the material usually is weaker (less hot and cold crushing strength and faster erosion at higher flow rates). Examples of refractory gas purging devices are described in U.S. Pat. No. 5,478,053, U.S. Pat. No. 5,820,816 and U.S. Pat. No. 6,669,896.

One known problem with refractory purging devices such as gas purging plugs is that in case of a reduction of pressure when the flow of pressurised air is stopped, molten metal may flow reversely into the device and infiltrate the channels and/or pores of the device through the gas outlet, driven by gravity. This creates not only a security concern but also an operational problem. Indeed, upon freezing of the molten melt in the channels or pores, the device is at least partly clogged. It is possible to unclog a clogged device by blowing high pressure gas into the channels and/or pores or by oxygen lancing the upper surface of the plug when the metallurgical vessel is empty, but these techniques are time consuming, are not always suitable, lead to severe erosion of the refractory material and do not always succeed to unclog the plug. Unless a plurality of independent channels are used, the infiltration by molten metal at one point of the gas outlet, usually leads to the complete or partial clogging of the whole device. To lower the risk of infiltration, the diameter or width of a channel is generally limited to not more than 1 mm, in order to offer a sufficient resistance to infiltration by capillarity. This measure is, however, detrimental to the efficacy of the purging device, as it strongly limits the gas flow rate through the plug.

SUMMARY OF THE INVENTION

There is provided a refractory purging device which is adapted for blowing gas into molten metal in a metallurgical vessel. The refractory purging device comprises a refractory main body which defines a gas inlet at a first longitudinal end for receiving purging gas, a gas outlet at a second longitudinal end for the purging gas to enter the molten metal, and a gas passage channel interconnecting the gas inlet and the gas outlet; wherein a plurality of molten metal receptacles for capturing or intercepting and retaining molten metal that flows reversely from the gas outlet into the gas passage channel is distributed in the gas passage channel. A refractory purging device comprising a plurality of molten metal receptacles mitigates problems associated with clogging or partial clogging of known refractory devices due to reverse flow or reverse infiltration of molten metal into the refractory device in case of reduction of pressure when purging gas flow is stopped.

A refractory purging device according to the present disclosure is advantageous because, for example, the lifetime of a purging device can be extended even after occurrence of partial infiltration of the gas passage channels by molten metal. In addition, refractory purging devices having gas passage channels with dimensions close to or even larger than 1 mm to increase air flow rate become more eligible, since partial infiltration is no longer fatal to the use of the devices.

The refractory purging devices may be refractory purging plugs, tuyeres, diffusers, bubbling blocks or pads. The refractory purging devices may comprise one or a plurality of gas passage channels.

The molten metal receptacle may include a molten metal capture aperture for capturing molten metal that flows reversely into the gas passage channel, the molten metal capture aperture facing the gas outlet.

The molten metal receptacle may comprise a pocket portion or a miniaturized reservoir to retain the molten metal that is captured or intercepted at the molten metal capture aperture.

In general, a gas passage channel defines a gas flow direction and a metal flow direction which is opposite to the gas flow direction. The molten metal receptacles may comprise a wall portion which protrudes or projects into the gas passage channel, preferably in a direction orthogonal to the metal flow direction, to define the molten metal capture aperture and the pocket portion or the miniaturized reservoir.

The wall portion may define a bridging portion which comprises a concave bottom or a recessed bottom. In an example, the opposite facing internal walls on the main refractory body in cooperation with the wall portion collectively define a molten metal receptacle.

In an example, molten metal receptacles are distributed in the gas passage channel along the metal flow direction, wherein a downstream molten metal receptacle is transversely offset from an upstream molten metal receptacle such that molten metal overflowed from the upstream molten metal receptacle can be captured or intercepted by the downstream molten metal receptacle.

The molten metal receptacles may be distributed in the gas passage channel in a direction transverse to the metal flow direction.

The transversely and/or longitudinally adjacent molten metal receptacles may be separated by a molten metal overflow path, the molten metal overflow path providing a guide to facilitate molten metal to overflow from an upstream molten metal receptacle which is more proximal to the gas outlet into a downstream molten metal receptacle which is more proximal to the gas inlet.

A downstream molten metal receptacle may be arranged such that its molten metal capture aperture is aligned with the overflow path of an upstream molten metal capture aperture to capture molten metal overflowed from the upstream molten metal receptacle.

The molten metal receptacles may be arranged in rows which are transverse to the metal flow direction. The molten metal receptacles of one row may be transversely offset from molten metal receptacles of an immediately upstream row such that a molten metal receptacle in an immediately upstream row is directly facing the molten metal overflow path of an immediately upstream row to receive molten metal overflowed from that upstream row.

The number (N) of molten metal receptacles distributed longitudinally along the metal flow direction may be N≥3, preferably ≥5, and more preferably ≥10.

The molten metal receptacles may be integrally formed on the main refractory body.

The gas passage channel may be elongate and extend transversely to the metal flow direction in a radial, concentric, annular or surrounding manner about a longitudinal centre axis (X1) of the main refractory body.

The gas passage channel may be cooperatively defined by opposite facing internal walls on the main refractory body, the transverse separation distance W between the opposite facing internal walls is not more than 2.0 mm, preferably not more than 1.5 mm, more preferably not more than 1.0 mm, and most preferably not more than 0.5 mm, and most preferably between 0.25 and 0.5 mm.

The transverse length (L) of the gas passage channel in a direction orthogonal or substantially orthogonal to the metal flow direction may be such that L/W≥3, more preferably ≥5, even more preferably ≥10, and most preferably ≥50. The gas passage channel is generally slit shaped.

The refractory main body may comprise a core portion which is surrounded by a peripheral portion, and the gas passage channel is defined by separation between opposite facing internal walls of the core portion and the peripheral portion. In an example, one of the opposite facing internal walls on the main refractory body which cooperate to define the gas passage channel is on the core portion and the other one is on the peripheral portion.

The molten metal receptacles may be integrally formed either on the core portion and projecting towards the peripheral portion, or on the peripheral portion and projecting towards the core portion. In particular, the projection is transverse to the metal flow direction. In an example, the molten metal receptacle, and more particularly, the pocket portion or the miniaturized reservoir, joins or interconnects the core portion and the peripheral portion.

The refractory main body may be a purging plug having a frusto-conical shape that tapers from the gas inlet towards the gas outlet.

The present disclosure also discloses a metallurgical vessel for holding molten metal comprising a refractory purging device disclosed herein, wherein the refractory purging device is to supply purging gas into molten metal contained in the metallurgical vessel.

The present disclosure has also disclosed a moulding tool for forming a plurality of molten metal receptacles on a gas passage channel of a refractory purging device, the refractory purging device comprising a refractory main body which defines a gas inlet, a gas outlet, and the gas passage channel interconnecting the gas inlet and the gas outlet and defining a gas flow direction, the plurality of molten metal receptacles being for capturing or intercepting and retaining molten metal that flows reversely from the gas outlet into the gas passage channel against the gas flow direction; wherein the moulding tool comprises a moulding insert on which a plurality of protruding shapes complementary to the molten metal receptacles is distributed.

The moulding insert may include a main insert body on which the plurality of protruding shapes is distributed, wherein the main insert body defines the gas inlet, the gas outlet and the gas passage channel, and wherein the protruding shapes defines the molten metal receptacles.

In general, the gas flow direction is opposite to the metal flow direction. In an example, the plurality of protruding shapes projects orthogonally or substantially from the main insert body to collectively form a capture interception along the metal flow direction.

In an example, the moulded insert is made of a heat dissipatable material such that the moulding insert is dissipated during heated hardening of the refractory materials. The dissipatable material may be paper, fibre, plastics, or metal with a low melting temperature. Dissipation of the moulding insert may be by melting, incineration, sublimation or other heat dissipation means.

There is also provided a method of making a refractory purging device according to the present disclosure, the refractory purging device comprising a refractory main body, a gas outlet, a gas passage channel interconnecting the gas inlet and the gas outlet, and a plurality of molten metal receptacles in the gas passage channel, wherein the plurality of molten metal receptacles is for capturing or intercepting and retaining molten metal that flows reversely from the gas outlet into the gas passage channel; the method including putting a moulding tool such as a moulding tool disclosed herein into a moulding apparatus to define the outer shape of the refractory purging device to define the gas inlet, the gas outlet, the gas passage channel and the plurality of molten metal receptacles, casting the moulding apparatus with a refractory material, and heat hardening the moulding apparatus casted with the refractory material until the moulding insert is eliminated to form the refractory gas purging device.

In one aspect, there is provided a device (1) for blowing gas into a metallurgical vessel. The device (1) comprises (a) a body (2) extending along a central axis (X1) comprising, (b) at least one gas flow channel (3) fluidly connecting a gas inlet (3a) located at one end of said body to a gas outlet (3b), located at the opposite end along said axis, said channel (3) being in the shape of a slit defined by a first and second opposed surfaces, characterized in that, (c) the at least one gas channel (3) comprises a series of continuous concave bridges (4) connecting the first and second opposing surfaces defining the channel, the bridges (4) having a concave side (4a) oriented towards the gas outlet (3b), wherein said concave bridges (4) are disposed in a staggered arrangement, such that any first shortest line running from the gas outlet (3b) to the gas inlet (3a) of the channel necessarily intercepts the concave side (4a) of at least one first bridge (41).

The refractory body (2) is elongate and axis (X1) is a longitudinal axis. The channel (3) may be planar or substantially planar, and preferably extends radially from, and along a plane comprising the longitudinal axis (X1) of the plug body (1).

The concave bridges (4), as an example of the molten metal receptacles, have one of the following geometries: a "U"-shape, a "V"-shape, an arc, preferably of circle or ellipse, an open rectangular or square box, a parabola.

A "shortest line running from the gas outlet to the gas inlet of the channel" in the present context generally corresponds to the theoretical direction molten metal would flow along in case it were to infiltrate a slit-shaped channel driven in particular by gravity. The shortest line corresponds to the metal flow direction. The terms gas flow channel (3) and the gas passage channel are interchangeably used herein. In an embodiment, any second shortest line running from either side of said first bridge, which is intercepted by said first shortest line, to the gas inlet of the channel necessarily intercepts the concave side of at least one second bridge. It is preferred that the same applies with a third shortest line intercepting the concave side of at least one third bridge and so on, wherein any $i^{th}$ shortest line running from either side of a $(i-1)^{th}$ bridge, which is intercepted by a $(i-1)^{th}$ shortest line, to the gas inlet of the channel necessarily intercepts the concave side of at least one $i^{th}$ bridge, until there is no more bridge between the $N^{th}$ bridge and the gas inlet. The value of N is preferably at least equal to 3, more preferably, N is at least equal to 5, most preferably N is at least equal to 10.

Different configurations of the one or more slit-shaped channels are possible. In a first embodiment, at least one channel surrounds the longitudinal axis (X1), thus defining a core separated from a surrounding layer by the slit forming the channel. In a second embodiment, at least one slit extends substantially along a plane. Said plane preferably extends radially from, the longitudinal axis (X1) of the plug body. In yet a preferred embodiment, several slits (either connected or separate) extend along planes comprising, and distributed radially about the longitudinal axis (X1) of the plug body. The expression "extends substantially along a plane" is meant to comprise the embodiment wherein the slit channel is corrugated about a plane.

The concave bridges form as many small reservoirs suitable for receiving and retaining metal which flow front intercepts them. They may have different geometries. In particular, it is preferred that the concave bridges have one of the following geometries: a "U"-shape, a "V"-shape, an arc, preferably of circle or ellipse, an open rectangular or square box, a parabola, and the like. The thickness of the slit, and therefore of the concave bridges is preferably not more than 2.0 mm, more preferably, not more than 1.5 mm, more preferably not more than 1.0 mm, and most preferably, not more than 0.5 mm, depending on the viscosity and fluid tension of the molten metal used. Generally speaking, excellent results are obtained with slit-shaped channel of thickness comprised between 0.25 and 0.5 mm.

The body of the purging plug of the present invention may be entirely made of dense refractory material, thus defining with the at least one slit-shaped channel a direct permeability system. In an alternative embodiment, at least part of the plug body (for example the surrounding layer) is made of a porous refractory material, thus defining with the slit channel(s) a mixed direct and indirect permeability system. For example, the plug may comprise a core made of a dense refractory ceramic, separated from a surrounding porous refractory layer by an annular slit shaped channel.

The present disclosure has also disclosed a metallurgical vessel comprising a gas purging plug as discussed above and herein, with the gas outlet in fluid communication with the interior of said vessel, as well as a process for producing such purging plug. A process for producing a gas purging plug as discussed above and herein comprises the following steps:
(a) providing a tool which cavity defines the volume of an elongated body (2) of the purging plug extending along a central longitudinal axis (X1);
(b) positioning in said tool at a location corresponding to the desired position of the channel slit, at least one foil, being removable during the heating step (d) of the process, said foil having a plurality of apertures over the surface thereof, and defining between the apertures a continuous path from a first end portion thereof corresponding to the channel gas inlet to a second, opposite end portion thereof corresponding to gas outlet;
(c) casting a refractory material in said tool provided with said foil;
(d) heating the purging plug at a temperature sufficient to harden the refractory material and to eliminate the foil. The process according to the invention is characterized in that, the apertures have a concave geometry with the concave side thereof oriented towards a first foil portion corresponding to the channel gas outlet, and are disposed in a staggered arrangement, such that any shortest line running from the first foil portion to an opposed, second foil portion corresponding to the channel gas inlet of the channel necessarily intercepts the concave side of at least one aperture.

In an embodiment, a portion of the tool becomes part of the purging plug as a metal casing cladding the peripheral surface of the refractory material. Depending on the desired geometry of the slit channels, more than one such foil may be necessary for the production of a purging plug. The foil(s) are removed during heating step (d) by melting, incineration, or sublimation. The heating step (d) can consist of a drying step of the purging plug. For example, the drying step can comprise a progressive temperature increase sub-step, a dwell sub-step (for example at a temperature comprised between 300° C. and 650° C. for 3 to 10 hours) in order to substantially remove free water from the refractory material and burn out a plastic foil and a progressive cooling sub-step. Alternatively, the heating step (d) can consist of a firing step. For example, the firing step can comprise a progressive temperature increase sub-step, a dwell sub-step (for example at a temperature comprised between 1200° C. and 1700° C. for 3 to 10 hours) in order to create a ceramic bond in the refractory material and burn out a plastic foil and a progressive cooling sub-step.

In another embodiment of the present process, an outer layer defining an inner space can first be formed. A foil can then be inserted in step (b) in the inner space of the outer layer and a core is then cast in step (c) in the remaining portion of the inner space defined by the foil. In yet another embodiment of the present process, a core can first be formed. A foil can then be wrapped in step (b) around said core and an outer layer is then cast in step (c) in the volume defined between the cavity and the foil wrapped around the core. With this technique, it is possible to yield a purging plug having a core of different porosity than the sheath separated from the former by an annular slit.

BRIEF DESCRIPTION OF THE DRAWINGS

Various embodiments of the present invention will be described by way of example with reference to the accompanying Figures, in which.

DETAILED DESCRIPTION OF THE INVENTION

Figure 1:
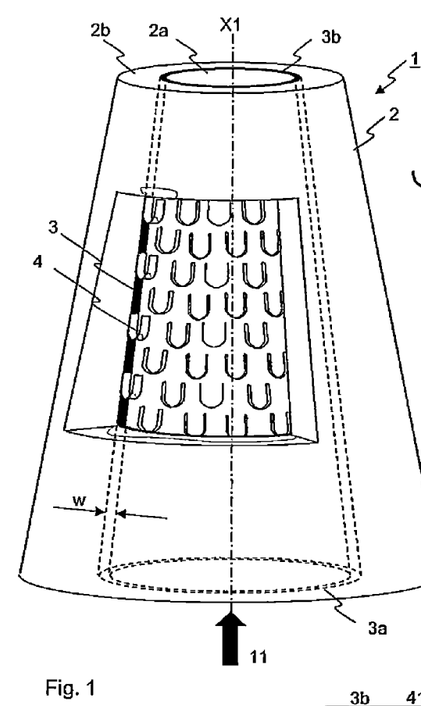
FIGS. 1 and 1A: show perspective views of a first embodiment and a second embodiment of a purging plug according to the present invention with a partial cut showing the structure of the concave bridges.
Figure 4:
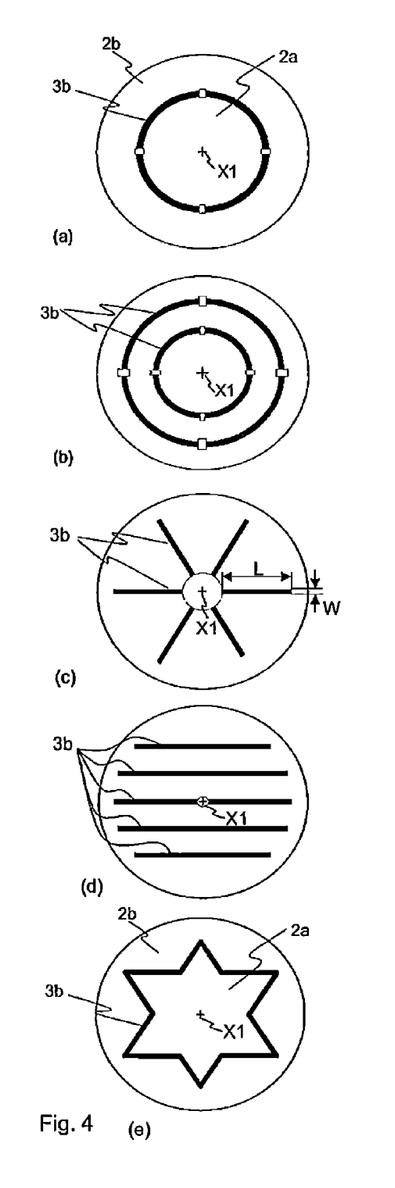
FIG. 4: shows various cross sections normal to the longitudinal axis (X1) illustrating different slit channel configurations.

As can be seen in FIG. 1, a purging plug (1) according to the present invention comprises a body extending along a longitudinal axis (X1) between a gas inlet (3a) at a first end of said body and a gas outlet (3b) at the opposite end of said body, along said longitudinal axis, the gas inlet (3a) being in fluid communication with the gas outlet (3b) via at least one slit shaped channel (3). The slit-shaped channel is defined by first and opposed, second channel surfaces, which distance to one another defines the opening width, W, of the channel slit (3). The opening length, L, of the channel is the distance which yields the area of a cut normal to the longitudinal axis (X1) of the slit opening upon integration with the opening width, W (cf. FIG. 4(c)). In case of an annular slit, as represented in FIG. 1, the opening length, L, of the slit is the perimeter of the annular slit. In case of a planar slit, as illustrated in FIG. 4(c), the opening length, L, of a slit is simply the length thereof. A slit shaped channel is defined as a channel having an opening width, W, much smaller than its opening length, L. In particular, a channel is considered to be slit shaped if the length to width ratio, L/W≥3, preferably, L/W≥5, more preferably, L/W≥10 and even L/W≥50. The geometry and disposition of the channel slit(s) within the purging plug body are not critical to the present invention, as long as the channel can be considered as slit shaped.

The present invention does not fully prevent molten metal to accidentally infiltrate the channels, but it strongly limits the depth of such infiltration and, in particular, permits the plug to still function in spite of a local infiltration. This is rendered possible by the use of a series of continuous concave bridges (4) connecting the first and second opposing surfaces defining the channel, with their concave side (4a) oriented towards the gas outlet (3b). Each concave bridge therefore acts as a mini retention tank, able to capture and retain a certain amount of molten metal that would have infiltrated the channel. The concave bridges (4) are separated from each other and disposed in a staggered arrangement, such that any first shortest line running from the gas outlet (3b) to the gas inlet (3a) of the channel necessarily intercepts the concave side (4a) of at least one first bridge (41). A "shortest line running from the gas outlet to the gas inlet" of the channel follows the flow direction of molten metal in case it were to infiltrate a slit-shaped channel free of concave bridges driven, in particular, by gravity. Since said shortest line necessarily intercepts at least one first bridge (41), the flow of molten metal (10) would be stopped by said at least one bridge, until the reservoir formed by the concave side of said at least one bridge is filled with metal. The concave bridges shall be separated from one another to provide a continuous gas path to allow pressurized gas to flow from the gas inlet (3a) to the gas outlet (3b), The gaps between any two adjacent bridges shall be filled by a bridge located downstream from the former two bridges, wherein the term "downstream" in this context is defined with respect to the direction of the molten metal flow, which is opposite to the gas flow direction.

A complete set of concave bridges (4) thus staggered such that any shortest line running from the gas outlet (3b) to the gas inlet (3a) intercepts exactly one concave bridge define one "level of entrapment", N=1. Theoretically, and depending on the volume of liquid metal each concave bridge is able to contain, a purging plug comprising one level of entrapment, N=1, would be sufficient to at least partly retain the flow of metal. In practice, it is preferred to increase the number of levels of entrapment to higher values to decrease the risk of leakage. The total number of levels of entrapment extending from the gas outlet (3b) to the gas inlet (3a) defines the "entrapment degree," N. Once at least one bridge (41) intercepting a molten metal flow is filled with metal, the melt will overflow on either sides of said bridge and flow further following the shortest path to the gas inlet (3a). As discussed above, a purging plug with an entrapment degree of one (N=1) may be sufficient to stop the metal flow altogether in case of small to moderate levels of infiltration, but in case of more substantial infiltrations, leading to the overflow of said bridge (41), there is no more retention means to slow down and stop the flow downstream from said bridge. For this reason, it is preferred that the purging plug of the present invention comprises an entrapment degree greater than one (N>1), preferably of at least two (N≥2), preferably of at least three (N≥3), more preferably of at least five (N≥5), most preferably of at least 10 (N≥10).

Figure 3:
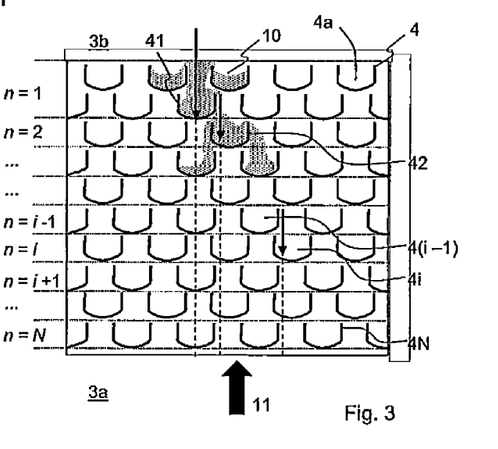
FIG. 3: shows an array of bridges according to the present invention, showing the flow path of a molten melt, as well as shortest lines joining the gas inlet to the gas outlet or to a nth bridge.

As illustrated in FIG. 3, an entrapment degree, N, higher than one can be obtained with a staggered arrangement, wherein any second shortest line running from either side of said first bridge (41), which is intercepted by said first shortest line, to the gas inlet (3a) of the channel necessarily intercepts the concave side (4a) of at least one second bridge (42) and so on, wherein any $i^{th}$ shortest line running from either side of a $(i-1)^{th}$ bridge (4(i−1)), which is intercepted by a $(i-1)^{th}$ shortest line, to the gas inlet (3a) of the channel necessarily intercepts the concave side (4a) of at least one $i^{th}$ bridge (4i), until there is no more bridge between the $N^{th}$ bridge (4N) and the gas inlet (3a).

The concave bridges may have a variety of shapes, sizes, and distributions as long as:

(a) they are suitable for retaining in their concavity a given volume of molten metal, and thus form an impervious wall spanning over the whole width of the slit and over their whole length between the two ends thereof, (b) their staggered arrangement does not let a shortest free flow line run from the gas outlet (3b) to the gas inlet (3a), and (c) their distribution defines a gas flow path from the gas inlet (3a) to the gas outlet (3b) generating acceptable pressure drop.

Figure 2:
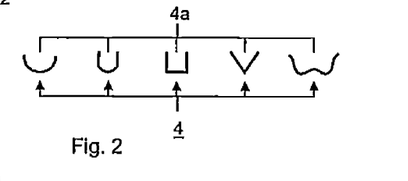
FIG. 2: shows various embodiments of geometries of the concave bridges according to the present invention.

FIG. 2 illustrates possible embodiments of geometries of concave bridges (4) suitable for the present invention. For example the bridges may have a "U"-shape, a "V"-shape, an arc, preferably of circle or ellipse, an open rectangular or square box, a parabola, and so on. The geometry is not necessarily "regular" as long as it comprises a concave side (4a) defining a retention tank. A same purging plug may comprise bridges of different geometries and/or sizes distributed over the slit channel(s) thereof, and their distribution may also vary within one slit or between two slits of a same plug.

The slit channels (3) may have a number of geometries. For example, FIG. 4 shows various embodiments of purging plugs comprising slot channels arranged differently on a plane normal to the longitudinal axis (X1). FIGS. 4(a) and (b) show two embodiments wherein one and two channels, respectively, surround said longitudinal axis (X1), thus defining a core (2a) separated from a surrounding layer (2b) by the slit forming the channel (3). More than two surrounding channels can be used, and it is clear that they need not be circular as illustrated in FIGS. 4(a) and (b), but may have any shape, curved or polygonal, forming a closed loop or not such as a star design as illustrated in FIG. 4(e). FIGS. 4(c) and (d) illustrate two embodiments wherein the slit does not form a closed loop. In the embodiments illustrated, the slits are rectilinear and arranged either radially from the centre of the cross section (cf. FIG. 4(c)) or extending parallel to one another (FIG. 4(d)). Again, when straight slits are depicted in FIGS. 4(c) and (d), it is clear that they may be curved and/or zigzagging as illustrated in FIG. 4(e).

Figure 1A:
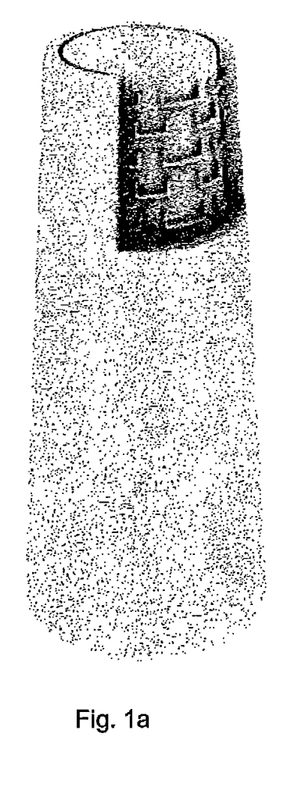

FIG. 1A shows a refractory purging device comprising a molten metal receptacle have a rectangular shaped bridge.

The slits-channel(s) extend from the gas inlet (3a) to the gas outlet (3b) at the opposite end of the plug body along the longitudinal axis (X1). The channels may extend substantially parallel to said longitudinal axis (X1) or not. In the embodiment illustrated in FIG. 1, the channel (3) is not parallel to the longitudinal axis, and follows the direction of the generators of a cone sharing the same vertex as the outside body of the purging plug. In case of a channels arrangement as illustrated in FIGS. 4(c) and (d), it would be suitable, albeit not mandatory, to have the channels extending parallel to the longitudinal axis (X1). The channels may extend linearly between gas inlet and outlet or be sinuous. The latter embodiment may be wished, or the result of a poorly controlled process, wherein the foil (23) used to create the channel (3) would be deformed or wrinkled during the process.

The opening width, W, of a slit-channel (3) may vary in the longitudinal direction as well as along the opening length, L, but it is simpler to manufacture a slit-channel (3) having a constant width, W, as it will be appreciated below. With the geometry proposed in the present invention, the slit-channel may have a larger width, W, than generally considered in the art as safe for preventing a risk of serious damage of the purging plug by infiltration of molten melt. In particular, slit-channels of width of up to 2 mm may be operated with the present invention. The width of the channel is, however, preferably not more than 1.5 mm, more preferably not more than 1.0 mm, and most preferably, not more than 0.5 mm.

The refractory material used for making the body of the purging plug is preferably at least partly made of a material with a relatively low permeability to gas. A refractory material is considered to have a relatively low permeability to gas, if its permeability is less than 4 $\mu m^2$ (equivalent to 40 nPm). If the body of the purging plug is made entirely of a refractory material with a relatively low permeability to gas, the purging plug defines a "direct permeability" system as defined supra. A mixed "direct/indirect permeability" system can be obtained by using a refractory material with a permeability to gas higher than 4 $\mu m^2$ for part of the body. For example, in a core/sheath geometry as illustrated in FIGS. 1 and 4(a) and (b), the core could be made of a refractory material of first permeability, and the surrounding sheath of a refractory material of second permeability, either higher or lower than the one of the core. For example, refractory materials such as alumina, alumina carbon or spinel, and the like may be used (both for the permeable and non-permeable (or of a relatively low gas permeability) materials, if any).

The purging plugs illustrated in the Figures are frustoconical, but the invention is of course not limited to such geometry, which may vary depending on the design of the metallurgical line. The peripheral surface of a core made of refractory material as described supra is often clad with a metal casing to mechanically strengthen the structure. In some embodiments, the metal cladding can be used as part of the mould into which the refractory material is cast during production of a purging plug. In an alternative embodiment, the metal casing is coupled to a fully manufactured refractory body by means of an adhesive or cement.

Figure 6:
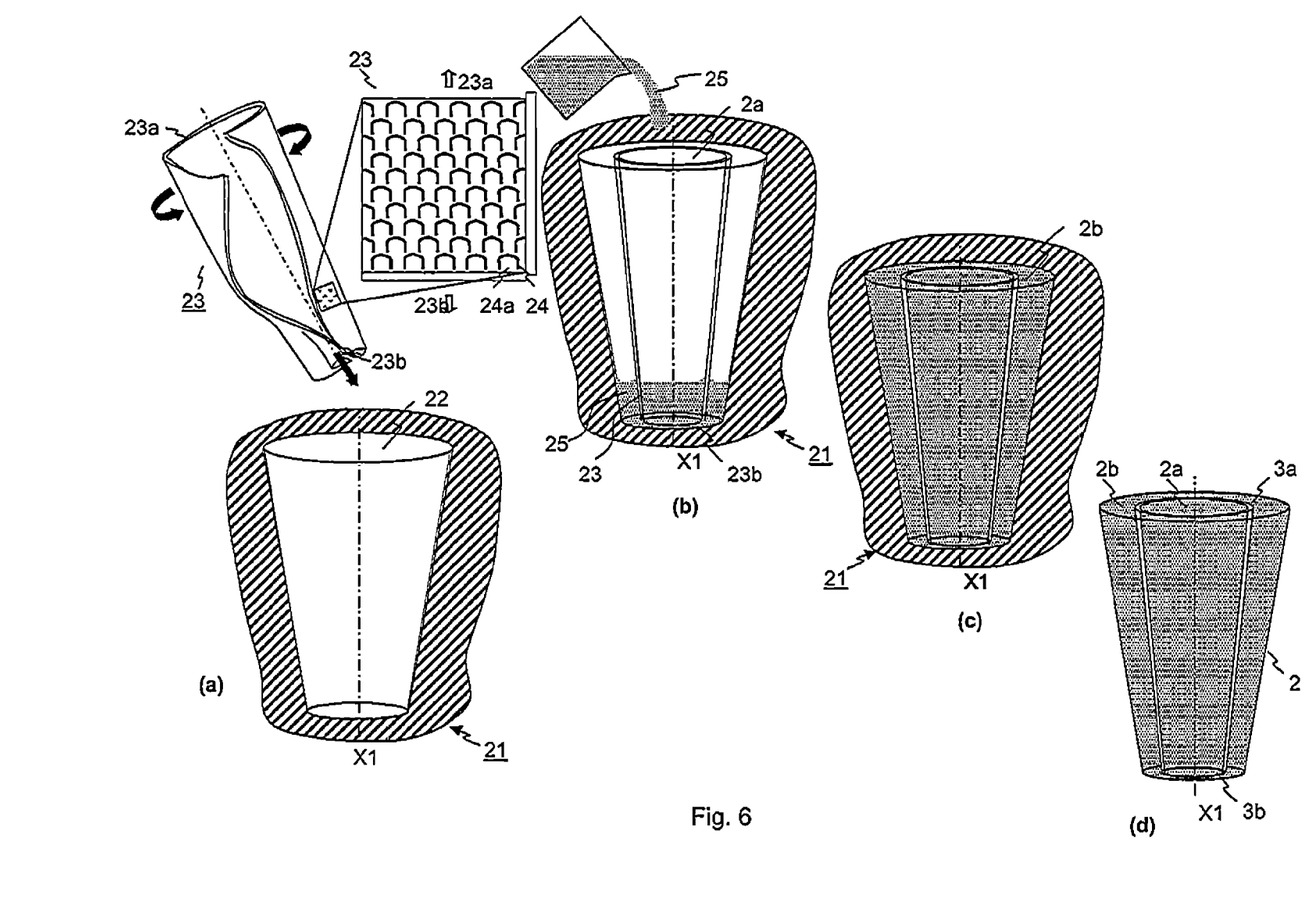
FIG. 6: illustrates schematically various steps of a first embodiment for producing a purging plug according to the present invention.

A purging plug according to the present invention may be produced very simply with a process comprising the following steps:
(a) providing a tool (21) which cavity (22) defines the volume of an elongated body (2) of the purging plug extending along a central longitudinal axis (X1). In a preferred embodiment, part of the tool is made of a metal casing which will be part of the final purging plug for mechanically strengthening the structure;
(b) as illustrated in FIG. 6(a), positioning in said tool at a location corresponding to the desired position of the channel slit (3), at least one foil (23), being removable during the heating step (d) of the process, said foil having a plurality of apertures (24) over the surface thereof, and defining between the apertures a continuous path from a first end portion (23a) thereof corresponding to the channel gas inlet (3a) to a second, opposite end portion (23b) thereof corresponding to gas outlet (3b); the foil can be made of paper, cardboard, wax or of a polymeric material such as PVC, PE or PP and should be sufficiently stiff to not fold over itself, wrinkle or corrugate during the process,
(c) casting a castable composition (25) in said tool provided with said foil (cf. FIG. 6(b));
(d) heating the purging plug at a temperature sufficient to harden the refractory material and to eliminate the foil (cf. FIG. 6(c)); a temperature greater than 300° C. is generally required for the hardening of the refractory material; for example, a temperature comprised between 400 and 650° C., preferably between 450 and 550° C. is generally sufficient to harden most refractory materials and to burn or at least melt the foil which elimination yields a slit shaped channel comprising staggered concave bridges as discussed above.

The process of the present invention is characterized in that, the apertures (24) have a concave geometry with the concave side (24a) thereof oriented towards a second foil portion (23b) corresponding to the channel gas outlet (3b), and are disposed in a staggered arrangement, such that any shortest line running from the second foil portion (23b) to an opposed, first foil portion (23a) corresponding to the channel gas inlet (3a) of the channel necessarily intercepts the concave side (24a) of at least one aperture (24).

The thickness of the foil (24) defines the width, W, of a slit channel formed upon elimination of the foil. The apertures (24) in the foil (23) serve to form the concave bridges (4)

spanning the width, W, of the slit channel, as castable refractory material (25) fills the apertures and thus connects the refractory material located on either sides of the foil (24). Upon elimination of the foil, bridges (4) made of refractory material are formed, having the same profile as the apertures (24) of the foil, and the same thickness, W, as the foil.

Figure 7:
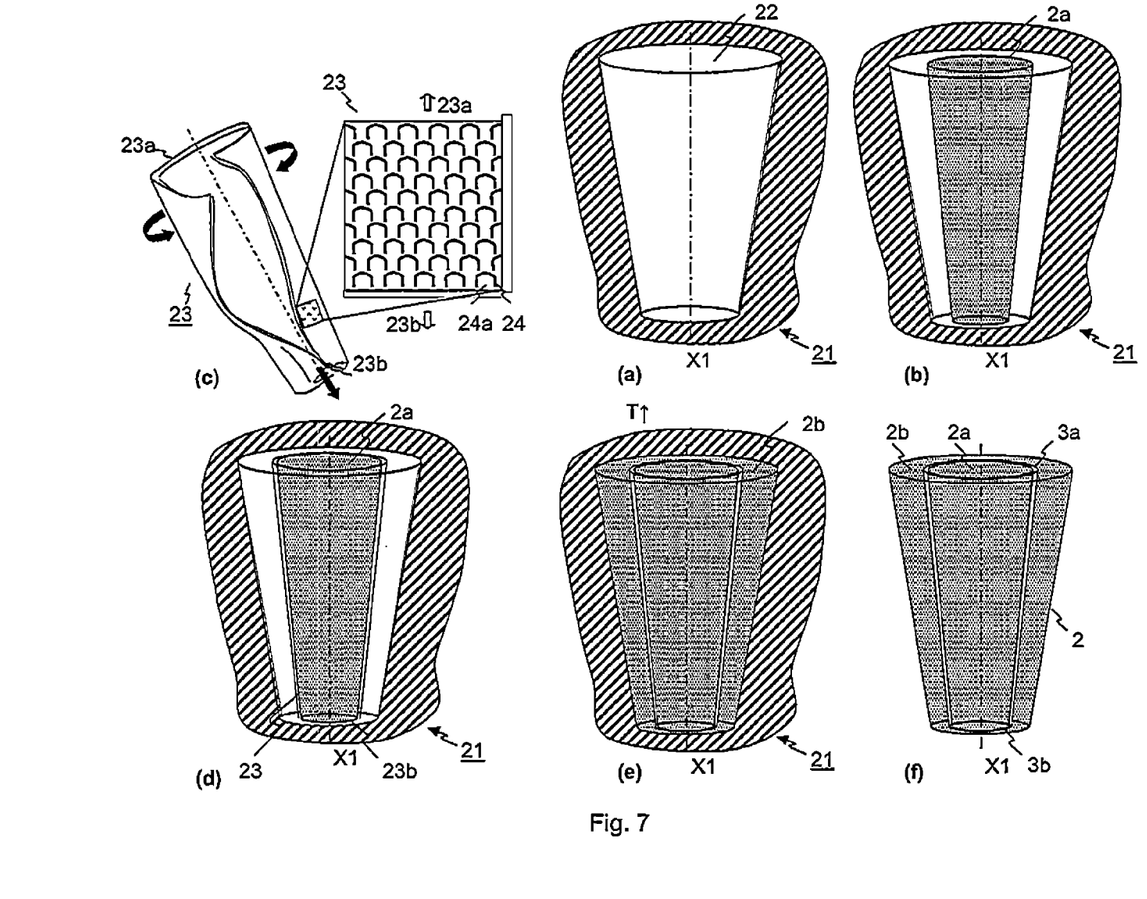
FIG. 7: illustrates schematically various steps of a second embodiment for producing a purging plug according to the present invention.

As illustrated in FIG. 7, in another embodiment, a core (2a) is first formed before step (b) (cf. FIG. 7(b)), around which said foil (23) is wrapped (cf. FIGS. 7(c) and (d)). An outer layer is then cast in step (c) in the volume defined between the cavity (21) and the foil (23) wrapped around the core (2a) (cf. FIG. 7(e)). After heating the purging plug can be removed from the tool. This embodiment is suitable for the production of mixed "direct/indirect permeability" plugs, wherein the refractory materials forming the core and surrounding sheath of the body have a different composition and/or porosity.

Figure 8:
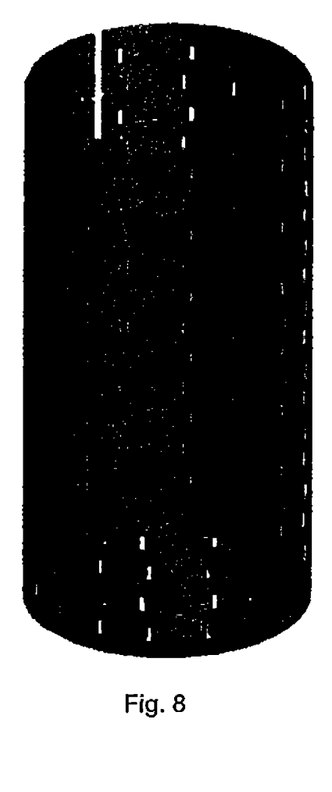
FIG. 8: shows a schematic perspective view of a moulding insert for making the refractory purging device of FIG. 1A.

FIG. 8 shows a moulding insert for making the refractory purging device of FIG. 1A.

Figure 5:
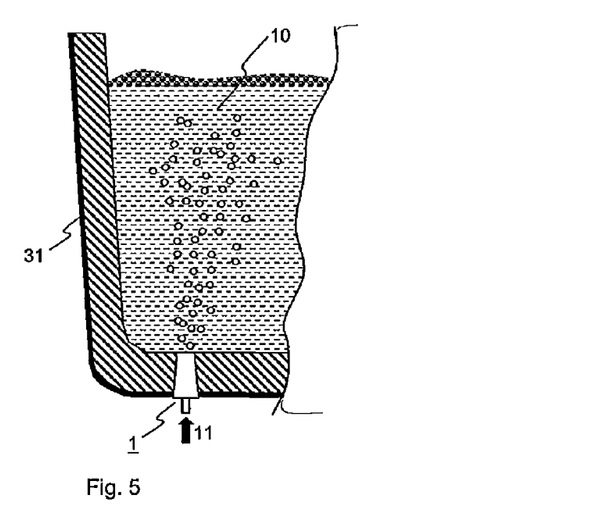
FIG. 5: shows a purging plug mounted on the bottom floor of a metallurgical vessel.

The present purging plug (1) is particularly suitable for injecting gas into a ladle, a tundish, and other similar metallurgical vessels. As illustrated in FIG. 5, the purging plug (1) when in use is embedded in the wall and lining of a metallurgical vessel (31), with the gas inlet facing the exterior side of the metallurgical vessel, and with the gas outlet facing the inside of the vessel, in contact with the molten metal. The terms "gas inlet" and "gas outlet" being defined with respect to the flow direction (11) of the gas being injected into the metallurgical vessel. It can be positioned at the bottom floor of such metallurgical vessels as illustrated in FIG. 5, where it is most sensitive to infiltrations by molten metal. Thanks to the array of retaining concave bridges (4) forming a barrier to infiltration deep into the gas channel (3) the service life of the purging plug is substantially increased compared with existing purging plugs. Furthermore, wider channels can be used than traditionally considered as safe, since minor infiltrations of molten metal do not lead to any substantial drop in the performance of the plug, contrary to traditional purging plugs. Indeed, besides containing the area and depth of infiltration to a limited number of bridges filled with metal, upon hardening, though the metal still fills the concave side of some bridges, the thin tongues of metal linking one bridge to the next bridge downstream often break thus allowing gas to flow even between two concave bridges filled with metal. While the disclosure has been described with reference to the example embodiments and the accompanying Figures, it should be appreciated that the scope of the disclosure is not limited to the embodiments as described or depicted in the Figures. Specifically, while reference is made to purging plugs in the description for the sake of simplicity and as a matter of convenience, it should be clearly understood that the present invention is not limited thereto. For example, while the disclosure has made reference to purging plugs, it should be appreciated that purging plugs are used as an example of refractory gas purging devices and the disclosure Is not limited thereto and can be applicable to other refractory purging devices such as refractory purging plugs, tuyeres, diffusers, bubbling blocks or pads and the like. In particular, the refractory purging device herein is able to prevent clogging of the plug by counter-current infiltration of metal melt or slag. Where features mentioned in the appended claims are followed by reference signs, such signs are included solely for the purpose of enhancing the intelligibility of the claims and are in no way limiting the scope of the claims.

I claim:

1. A refractory purging device for blowing gas into molten metal in a metallurgical vessel, the refractory purging device comprising a refractory main body which defines a gas inlet at a first longitudinal end for receiving purging gas, a gas outlet at a second longitudinal end for the purging gas to enter the molten metal, and a gas passage channel interconnecting the gas inlet and the gas outlet; wherein a plurality of molten metal receptacles for capturing or intercepting and retaining molten metal that flows reversely from the gas outlet into the gas passage channel is distributed in the gas passage channel, wherein, each molten metal receptacle comprises a pocket portion or a miniaturized reservoir to retain the molten metal that is captured or intercepted at the molten metal capture aperture, the receptacles are forming bridges connecting first and second opposing surfaces defining the channel and the gas passage channel defines a gas flow direction and a metal flow direction which is opposite the gas flow direction, and wherein the molten metal receptacles comprise a wall portion which protrudes into the gas passage channel in a direction orthogonal or substantially orthogonal to the metal flow direction to define the molten metal capture aperture and the pocket portion or the miniaturized reservoir.

2. A refractory purging device according to claim 1, wherein the molten metal receptacles include a molten metal capture aperture for capturing molten metal that flows reversely into the gas passage channel, the molten metal capture aperture facing the gas outlet.

3. A refractory purging device according to claim 1, wherein the molten metal receptacles are distributed in the gas passage channel and along the metal flow direction; and wherein a downstream molten metal receptacle is transversely offset from an upstream molten metal receptacle such that molten metal overflowed from the upstream molten metal receptacle will be captured by the downstream molten metal receptacle.

4. A refractory purging device according to claim 1, wherein the molten metal receptacles are distributed in the gas passage channel in a direction transverse to the metal flow direction, and wherein transversely adjacent molten metal receptacles are separated by a molten metal overflow path, the molten metal overflow path providing a guide to facilitate molten metal to overflow from an upstream molten metal receptacle which is more proximal to the gas outlet into a downstream molten metal receptacle which is more proximal to the gas inlet.

5. A refractory purging device according to claim 4, wherein a downstream molten metal receptacle is arranged such that its molten metal capture aperture is aligned with the overflow path of an upstream molten metal capture aperture to capture molten metal overflowed from the upstream molten metal receptacle.

6. A refractory purging device according to claim 1, wherein the molten metal receptacles are arranged in rows which are transverse to the metal flow direction; and wherein the molten metal receptacles of one row are transversely offset from molten metal receptacles of an immediately upstream row such that a molten metal receptacle in an immediately upstream row is directly facing the molten metal overflow path of an immediately upstream row to receive molten metal overflowed from that upstream row.

7. A refractory purging device according to claim 3, wherein the number (N) of molten metal receptacles distributed longitudinally along the metal flow direction is N>3.

8. A refractory purging device according to claim 1, wherein the molten metal receptacles are integrally formed on the main refractory body.

9. A refractory purging device according to claim 1, wherein the gas passage channel is elongate and extends transversely to the metal flow direction in a manner selected from the group consisting of radial, concentric, annular and surrounding, about a longitudinal central axis of the main refractory body.

10. A refractory purging device according to claim 1, wherein the gas passage channel is defined by opposite facing internal walls on the main refractory body, and the transverse separation distance, W, between the opposite facing internal walls is equal to or less than 2.0 mm, and equal to or greater than 0.25 mm.

11. A refractory purging device according to claim 10, wherein the transverse length (L) of the gas passage channel in a direction orthogonal to the metal flow direction is such that L/W>3.

12. A refractory purging device according to claim 1, wherein the refractory main body comprises a core portion surrounded by a peripheral portion, and the gas passage channel is defined by separation between opposite facing internal walls of the core portion and the peripheral portion.

13. A refractory purging device according to claim 1, wherein the refractory main body has a frusto-conical shape that tapers from the gas inlet towards the gas outlet.

14. A metallurgical vessel for holding molten metal comprising a refractory purging device according to claim 1, wherein the refractory purging device is configured to supply purging gas into molten metal contained in the metallurgical vessel.

15. Device for blowing gas into a metallurgical vessel comprising:
   (a) a body extending along a central axis (X1) comprising,
   (b) at least one gas flow channel fluidly connecting a gas inlet located at one end of said body to a gas outlet, located at the opposite end along said axis, said channel being in the shape of a slit defined by a first and second opposed surfaces;
   wherein the at least one gas channel comprises a series of continuous concave bridges connecting the first and second opposing surfaces defining the channel, the bridges having a concave side oriented towards the gas outlet; and
   wherein said concave bridges are disposed in a staggered arrangement, such that any first shortest line running from the gas outlet to the gas inlet of the channel necessarily intercepts the concave side of at least one first bridge.

* * * * *